US008686695B2

(12) United States Patent
Tripathi et al.

(10) Patent No.: US 8,686,695 B2
(45) Date of Patent: Apr. 1, 2014

(54) DIRECT POWER AND STATOR FLUX VECTOR CONTROL OF A GENERATOR FOR WIND ENERGY CONVERSION SYSTEM

(75) Inventors: Anshuman Tripathi, Singapore (SG); Lars Helle, Suldrup (DK); Allan Holm Jörgensen, Aalborg Ø (DK); Cao Shu Yu, Singapore (SG); Saurabh Gupta, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 217 days.

(21) Appl. No.: 13/123,722

(22) PCT Filed: Oct. 27, 2009
(Under 37 CFR 1.47)

(86) PCT No.: PCT/EP2009/064133
§ 371 (c)(1),
(2), (4) Date: Oct. 6, 2011

(87) PCT Pub. No.: WO2010/049412
PCT Pub. Date: May 6, 2010

(65) Prior Publication Data
US 2013/0009611 A1 Jan. 10, 2013

Related U.S. Application Data

(60) Provisional application No. 61/108,668, filed on Oct. 27, 2008.

(30) Foreign Application Priority Data

Oct. 27, 2008 (DK) ................................ 2008 01477

(51) Int. Cl.
*H02P 9/04* (2006.01)
*H02P 11/00* (2006.01)

(52) U.S. Cl.
USPC .............................................. 322/23; 322/89

(58) Field of Classification Search
USPC ........... 322/23, 89; 416/204 R, 204 A, 244 R, 416/244 A, 245 R, 245 A
See application file for complete search history.

(56) References Cited

U.S. PATENT DOCUMENTS

| 6,597,148 B1 | 7/2003 | Niemela |
| 2001/0017529 A1 | 8/2001 | Nozari |
| 2008/0136380 A1 | 6/2008 | Hoffmann et al. |

FOREIGN PATENT DOCUMENTS

| CN | 1881767 A | 12/2006 |
| JP | 04308491 A | 10/1992 |
| WO | WO 2008/145128 | * 12/2008 |

OTHER PUBLICATIONS

European Patent Office, Written Opinion issued in related International Application No. PCT/EP2009/064133 dated Aug. 27, 2010.
European Patent Office, Search Report issued in related International Application No. PCT/EP2009/064133 dated Apr. 16, 2010.

* cited by examiner

*Primary Examiner* — Tulsidas C Patel
*Assistant Examiner* — Thomas Quigley
(74) *Attorney, Agent, or Firm* — Patterson & Sheridan, LLP

(57) ABSTRACT

A method for controlling a variable speed wind turbine generator is disclosed. The generator is connected to a power converter comprising switches. The generator comprises a stator and a set of terminals connected to the stator and to the switches of the power converter. The method comprises: determining a stator flux reference value corresponding to a generator power of a desired magnitude, determining an estimated stator flux value corresponding to an actual generator power, determining a difference between the determined stator flux reference value and the estimated stator flux value, and operating said switches in correspondence to the determined stator flux reference value and the estimated stator flux value to adapt at least one stator electrical quantity to obtain said desired generator power magnitude.

26 Claims, 10 Drawing Sheets

DIRECT POWER AND STATOR FLUX VECTOR CONTROL OF A GENERATOR FOR WIND ENERGY CONVERSION SYSTEM

TECHNICAL FIELD

The present invention generally relates to power converters, and more specifically to power converters that may be connected to wind turbine generators (WTG) which operate at variable speeds, thereby providing a voltage and current with variable amplitude and frequency.

BACKGROUND OF THE INVENTION

Wind has been used for a long time as a source of power and in recent years it has become very common to use the wind for producing electrical power. In order to do so, the power in the wind is captured by a set of blades (normally two or three) of a wind power plant. The wind captured by the blades causes a shaft connected to the blades to rotate. The shaft is connected to a rotor of a generator, which hence rotates at the same speed as the shaft, or at a multiple of the speed of the shaft in case the rotor is connected to the shaft via a gearbox. The generator then converts the mechanical power provided by the wind into electrical power for delivery to a grid.

In order to optimize the efficiency of a wind turbine generator, it is preferred to use a variable speed generator, wherein the speed of the rotor and hence the shaft and the blades depend on the wind speed. This implies that an optimum operating point for the WTG at various wind speeds must be established. This is done by controlling the torque or power delivered by the generator. The control system in a WTG normally control of the reactive power interchanged between the WTG and the grid as well as the active power drawn from the WTG in order to track the optimum operating point for the WTG. Active power is the component of total, or apparent, electric power that performs work and is measured in watts. The actual work performed by the active power differ it from reactive power which is measured in volt-amperes reactive and establishes and sustains the electric and magnetic fields of alternating current machines. The apparent power, measured in volt-amperes, is the vector sum of the real and reactive power.

Power and torque of a WTG are related by the angular velocity (i.e. the rotational speed of the rotor) according to $$P = \omega_{rotor} \cdot T$$

This implies that torque and power control exhibit different characteristics when applied to a WTG. More specifically, when controlling the torque of a WTG, it is necessary to include the rotor speed in the control loop. Power control is hence superior to torque control when the signal to be controlled is power since the transient response is different for the two control methods, i.e. when using torque control, a change in power would require both the rotor speed and the torque to settle before proper control may be applied.

A first type of control systems for WTGs relate to the control of (normally) three 120° spatially displaced sinusoidal voltages which are applied to the three stator phases of the generator. The generation of the sine waves is based on the properties of the generator, i.e. an equivalent model for the generator when operating in its steady state is derived from the electrical and mechanical characteristics of the generator wherein the control system is designed based on the type of generator used (e.g. asynchronous or synchronous).

The generation of one of the sine waves in the three phase system is normally performed independently of the other sine waves, i.e., this type of control systems operates as three separate single phase system controls rather than one common control of a three phase system. This fact results in that any imbalance in the three phase system or any interaction between the phases will not be considered in this type of control. Moreover, it is evident that the generator model will only be valid during steady state operation of the generator. During transient operation of the generator (start, stop, load changes, etc.) the control will hence allow high peak voltage and current transients. This result in a decreased power conversion efficiency as well as a need to oversize the electrical components of the WTG system in order to cope with transient surge currents and voltages.

In order to overcome the drawbacks of the above control structure, an alternative control structure generally named Field Oriented Control (FOC) have been introduced. The main idea behind FOC is to control the stator currents of the generator by using a vector representation of the currents. More specifically, FOC is based on coordinate transformations which transform a three phase time and speed dependent system into a two coordinate time invariant system.

The advantage of performing a transformation from a three phase stationary coordinate system to a rotating coordinate system is that the control of the generator may be done by controlling DC quantities. The transformation is performed in two steps: 1) transformation from the three phase abc stationary coordinate system to a two phase so called $\alpha\beta$ stationary coordinate system (known as Clarke transformation), and 2) transformation from the $\alpha\beta$ stationary coordinate system to a dq rotating coordinate system (known as Park transformation). More specifically, the transformation from the natural abc reference frame to the synchronous dq reference frame is obtained by the equations $$[\alpha_u \ \beta_u \ 0_u] = [a_u \ b_u \ c_u] \frac{2}{3} \begin{bmatrix} 1 & 0 & \frac{1}{2} \\ -\frac{1}{2} & \frac{\sqrt{3}}{2} & \frac{1}{2} \\ -\frac{1}{2} & -\frac{\sqrt{3}}{2} & \frac{1}{2} \end{bmatrix}$$

and $$[d_u \ q_u \ 0_u] = [\alpha_u \ \beta_u \ 0_u] \begin{bmatrix} \cos\theta & -\sin\theta & 0 \\ \sin\theta & \cos\theta & 0 \\ 0 & 0 & 1 \end{bmatrix}$$

which gives $$[d_u \ q_u \ 0_u] = [a_u \ b_u \ c_u] \frac{2}{3} \begin{bmatrix} \cos\theta & -\sin\theta & \frac{1}{2} \\ \cos\left(\theta - \frac{2\pi}{3}\right) & -\sin\left(\theta - \frac{2\pi}{3}\right) & \frac{1}{2} \\ \cos\left(\theta + \frac{2\pi}{3}\right) & -\sin\left(\theta + \frac{2\pi}{3}\right) & \frac{1}{2} \end{bmatrix}$$

where $\theta = \omega t$ is the angle between the stationary $\alpha$ axis and the synchronous d axis.

Controlling a generator by means of FOC requires the provision of a q axis aligned torque component and a d axis aligned flux component as input to the system. As explained above, the d and q oriented components are transformations from the stationary three phase coordinate system which implies that the FOC, due to the direct coupling to the three phase electrical quantities, will handle both steady state and transient operation of system irrespective of the generator model.

The electromechanical torque $T_{EM}$ of the generator in the dq coordinate system may be expressed as $$T_{EM} \propto \Psi_{rotor} \cdot i_{qstator}$$

which makes it easy to apply direct torque control in comparison to first type of control system disclosed above. More specifically, by keeping the amplitude of the rotor flux at a fixed value it is possible to control the torque component of the stator current due to the linear relationship between torque and torque component $i_{qstator}$.

Another technical advantage of FOC compared direct three phase control is the existing level of technical know-how that has been practiced in the DC-drives industry. This leads to a substantial reduction in the design-to-market time of any drive that is controlled using an FOC controller.

U.S. Pat. No. 5,083,039 discloses a variable speed wind turbine comprising a turbine rotor that drives a multiphase generator, a power converter with switches that control stator electrical quantities in each phase of the generator, a torque command device associated with turbine parameter sensors that generates a torque reference signal indicative of a desired torque, and a generator controller operating under field orientation control and responsive to the torque reference signal for defining a desired quadrature axis current and for controlling the switches to produce stator electrical quantities that correspond to the desired quadrature axis current.

Despite the advantages with FOC disclosed above, there are shortcomings of the conventional controllers that the industry has lived with. These constitute e.g. (a) constraint to maintain correct decoupling between the flux and torque producing components of the stator currents during steady state and dynamics, (b) controlling the currents using linear controllers at higher speeds and higher modulation index. Case (a) relates to the parameter sensitivity and the need for adaptation of the same. This may put the controller reliability into stress under extreme conditions of load. Case (b) on the other hand relates to under utilization of the DC-link voltage due to lack of faithful control at higher modulation indexes.

As both these conditions are critical for a high power drive operation from both reliability and cost view point, it is important to provide alternative methods for generator power control.

SUMMARY OF THE INVENTION

In view of the above, an objective of the invention is to provide an alternative method to the classical FOC for controlling the power output of a generator.

In particular, an objective is to provide a method for determining the optimum switching times for a space vector modulation scheme using a stator flux vector error signal.

Another objective of the present invention is to provide a method and apparatus for efficiently controlling the stator current in a generator.

According to a first aspect, the present invention is realized by a method for controlling a variable speed wind turbine generator connected to a power converter comprising switches, said generator comprising a stator and a set of terminals connected to said stator and to said switches, said method comprising:

determining a stator flux vector reference value corresponding to a generator power of a desired magnitude, determining an estimated stator flux vector value corresponding to an actual generator power, and operating said switches in correspondence to the determined stator flux reference value and the estimated stator flux value to adapt at least one stator electrical quantity to obtain said desired generator power magnitude.

An advantage of this embodiment is that the switches are directly operated based on the stator flux in a stationary reference frame. The need for an additional transformation into a synchronous reference frame (such as in FOC) is hence avoided reducing the computational requirements on the control unit. Moreover, since the switches are directly operated based on the stator flux there is no constraint to maintain correct decoupling between the flux and torque producing components of the stator currents.

According to one embodiment of the invention, a stator flux difference value between the determined stator flux reference value and the estimated stator flux value may be determined and the switches may be operated in correspondence to said determined stator flux difference value.

An advantage of this embodiment is that the switches are directly operated based on a stator flux difference value which makes it possible to quickly derive the correct switching times for the switches.

According to one embodiment of the invention, a stator flux difference vector with a magnitude and direction may be determined by means of the difference between the stator flux vector reference value and the estimated stator flux vector value, and said switches may be operated based on said stator flux difference vector.

An advantage of this embodiment is that the switches are directly operated based on the phase and amplitude of a stator flux difference vector which facilitates a rapid determination of the correct switching times for the switches.

According to one embodiment of the invention, the switches may be operated according to a pulse width modulation scheme in order to generate a synthesized voltage waveform at the stator terminals.

An advantage of this embodiment is that the synthesized waveform may be generated with a high degree of efficiency due to the low losses associated with PWM switching.

According to one embodiment of the invention, the switches may be operated according to a space vector modulation scheme for controlling a switching pattern of said switches.

An advantage of this embodiment is that the space vector modulation scheme makes it possible to generate the switching pattern with a minimum of processing power.

According to one embodiment of the invention, the switching pattern may be formed by applying one or more vectors during one or more switching times, and said switching times for the switching pattern may be determined from the magnitude and direction of the stator flux difference vector.

An advantage of this embodiment is that the switching pattern may be determined in simple way from the space vector modulation scheme taking the phase and amplitude information of the stator flux difference vector into account.

According to one embodiment of the invention, the switches may comprise a first and a second set of switches and first set of the switches may be operated to an on-state during a first time interval, $\tau_a$, and the second set of the switches to an on-state during a second time interval, $\tau_b$.

An advantage of this embodiment is that the space vector modulation scheme may be efficiently implemented with a low demand for computational power.

According to one embodiment of the invention the first and second time intervals may be determined according to $$\tau_a = \frac{|\Delta\Psi_s^*(k)|\sin\left(\frac{\pi}{3} - \gamma\right)}{\frac{\pi}{3}\sin\left(\frac{\pi}{3}\right)}$$

$$\tau_b = \frac{|\Delta\Psi_s^*(k)|\sin(\gamma)}{\frac{\pi}{3}\sin\left(\frac{\pi}{3}\right)}$$

An advantage of this embodiment is that the on and off times for the switches may be directly and rapidly determined from the stator flux difference vector.

According to a second aspect, the present invention is realized by an apparatus for controlling a variable speed wind turbine generator connected to a power converter comprising switches, said generator comprising a stator and a set of terminals connected to said stator and to said switches, said apparatus comprising:

a power controller adapted to determine a stator flux vector reference value corresponding to a generator power of a desired magnitude, flux vector estimator adapted to determine an estimated stator flux vector value corresponding to an actual generator power, and a switch control unit adapted to operate said switches in correspondence to the determined stator flux reference value and the estimated stator flux value to adapt at least one stator electrical quantity to obtain said desired generator power magnitude.

According to a third aspect, the invention is realized by a computer program, comprising computer program code for performing the steps of the method mentioned above when executed in a device with data processing capabilities.

According to a fourth aspect, the invention is realized by method for generating a stator flux reference vector for controlling a generator comprising a stator and a rotor, said method comprising:

determining a first stator flux reference vector component corresponding to a magnetization flux of a desired magnitude for the generator, determining a magnitude of current equivalent corresponding to a power and/or torque-producing stator flux of a desired magnitude for the generator, comparing the current equivalent with an actual stator current and adjusting the magnitude of the current equivalent if the actual stator current is above a predefined threshold, determining a second stator flux reference vector component based on the adjusted current equivalent, and determining a stator flux reference vector based on the first and second stator flux reference vector components.

An advantage of this embodiment is that the stator flux reference vector always has optimum characteristics with respect to generating an optimum stator current at every instant in time at different load conditions.

According to one embodiment the current equivalent may be limited if the actual stator current is above the predefined threshold.

An advantage with this embodiment is that the stator flux reference vector always has optimum characteristics in respect of generating a minimum stator current for a given active power provided by the generator. Over currents in the system are hence efficiently avoided.

According to one embodiment the first stator flux reference vector component may be based on the magnetization flux and an angular position of the rotor.

An advantage of this embodiment is that the first stator flux reference vector component may be easily determined since the magnetization flux is fixed by the rotor characteristics.

According to one embodiment the second stator flux reference vector component is based on the power and/or torque-producing stator flux and an angular position of the rotor.

An advantage of this embodiment is that the second stator flux reference vector may be easily determined from the desired power output from the generator.

According to one embodiment the second stator flux vector reference component leads the first stator flux reference vector component by 90°.

An advantage of this embodiment is that the magnetization flux is decoupled from the torque/power producing flux, hence facilitating the determination of the optimal stator current.

According to one embodiment a power reference value corresponding to an output power of a desired magnitude from the generator may be determined, the power reference value may be compared with an actual power value corresponding to the actual output power from the generator and the magnitude of current equivalent may be determined based on the difference between the power reference value and the actual power value.

According to one embodiment the magnitude of the current equivalent is adjusted based on a rotating speed of the generator.

An advantage of this embodiment is that the current equivalent may be compensated for the fact that the active power delivered by the generator is a function of both torque and speed.

According to one embodiment the stator of the generator is connected to switches in a power converter and the switches are operated in correspondence to the determined total stator flux reference vector to adapt at least one stator electrical quantity to obtain said desired generator power magnitude.

An advantage of this embodiment is that the generator may be efficiently controlled at low losses in the power converter in order to achieve the desired power magnitude.

According to one embodiment an actual stator flux vector of the generator may be estimated, a stator flux difference vector between the determined total stator flux reference vector and the estimated stator flux vector may be determined and said switches may be operated in correspondence to the determined stator flux difference vector to adapt at least one stator electrical quantity to obtain said desired generator power magnitude.

An advantage of this embodiment is that the switches may be easily and efficiently controlled by means of the stator flux difference vector. The determination of the switching times for the switches on the converter is facilitated by use of the stator flux difference vector.

According to a fifth aspect, the present invention is realized by an apparatus for generating a stator flux reference vector for controlling a generator comprising a stator and a rotor, said apparatus comprising:

a first vector generator for determining a first stator flux reference vector component corresponding to a magnetization flux of a desired magnitude for the generator, a power controller for determining a magnitude of current equivalent corresponding to a power and/or torque-producing stator flux of a desired magnitude for the generator, a current limiter for comparing the current equivalent with an actual stator current and adjusting the magnitude of the current equivalent if the actual stator current is above a predefined threshold, a second vector generator for determining a second stator flux reference vector component based on the adjusted current equivalent, and a combiner for determining a stator flux reference vector based on the first and second stator flux reference vector components.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
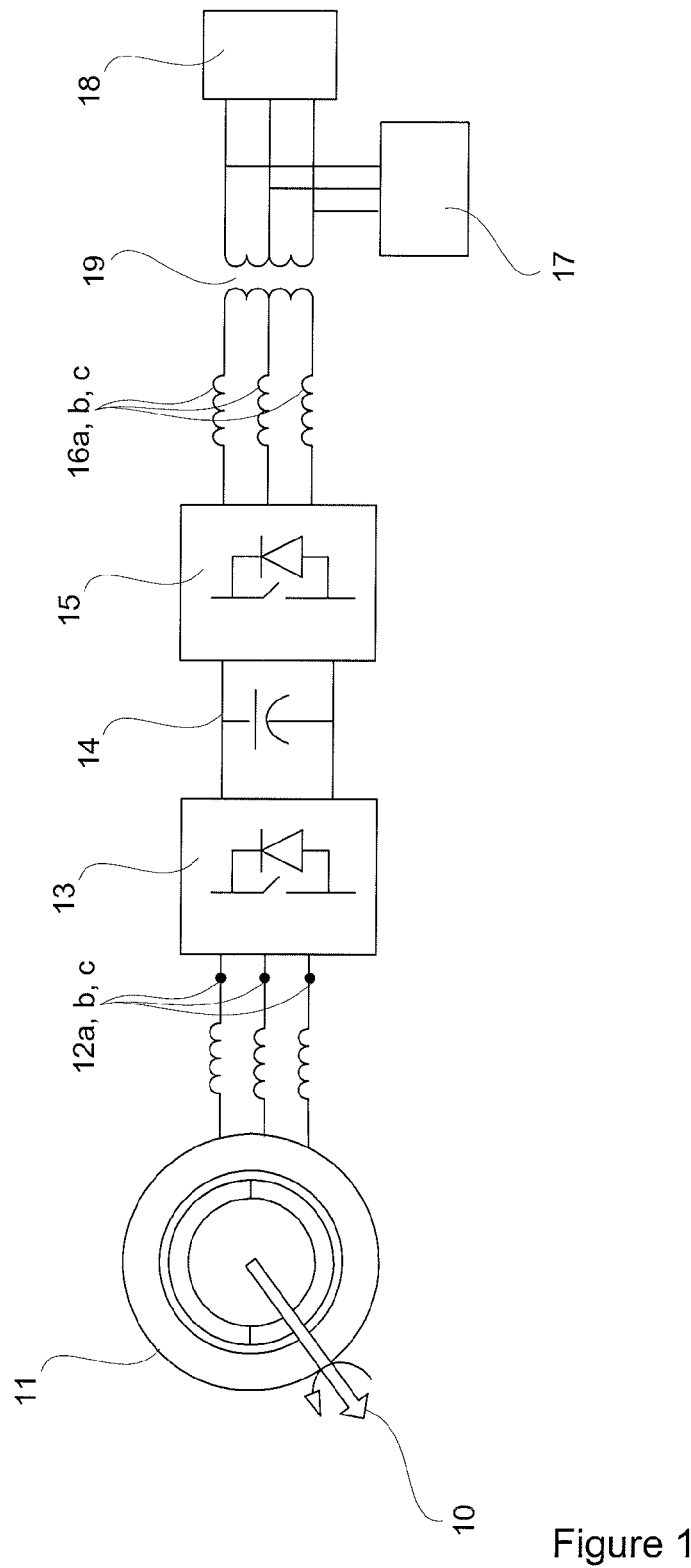
FIG. 1 illustrates generator converter system according to a preferred embodiment of the present invention.

FIG. 1 illustrates an example of a generator converter system according to a preferred embodiment of the present invention.

A shaft 10 transfers mechanical energy from an energy source, preferably a set of wind turbine blades (not shown), to a rotor of a variable speed generator 11. The shaft is preferably connected to the wind turbine blades, and to the rotor via a gearbox in order to adapt the rotational speed of the shaft 10 (i.e. speed of the wind turbine blades) to a speed range suitable for the generator 11. The generator 11 then converts the mechanical energy provided via the shaft 10 into electrical energy and delivers the electrical energy at a set of stator terminals 12a, 12b, 12c. For optimum performance in respect of converting the wind energy into electrical energy the shaft 10 will vary its speed as a function of the wind speed. Since the rotational speed of the rotor of the generator 11 is proportional to the rotational speed of the shaft 10, the amplitude and frequency of the voltage signal provided by the generator 11 at the stator terminals 12a, 12b, 12c will vary according to the rotational speed of the shaft 10. The generator may be a singly- or doubly-fed synchronous generator, a permanent magnet (PM) generator, an induction generator or any other type of generator comprising a stator winding.

The terminals 12a, 12b, 12c of the generator 11 are connected to a generator side power converter 13. The converter 13 is preferably a three phase bridge converter 13 which includes six switches illustrated for the sake of clarity by the single switch and diode in FIG. 1. As will be disclosed in more detail below, the switches are arranged in a set of upper and lower switches which preferably are in the form of solid state devices, such as MOSFETs, GTOs or IGBTs. Other kind of switches, such as BJTs, however are equally possible depending on design considerations of the converter 13. The converter 13 will under normal operation function as an active rectifier converting the variable frequency AC voltage provided by the generator 11 into a DC voltage. The conversion is controlled using a pulse width modulation scheme, wherein control signals are applied to the switches in the converter 13 in order to provide the desired conversion functionality. In a preferred embodiment the switches are controlled by employing space vector modulation scheme, as will be disclosed below.

The output from the converter 13 is provided to a DC link 14, which comprises a link capacitor for reducing the voltage ripple on the DC link.

The DC link 14 is connected to a grid side power converter 15. The topology of the grid side power converter 15 is similar to the generator side power converter 13 disclosed above. The grid side power converter 15 normally operates as an inverter for converting the DC voltage on the DC link 14 into a regulated AC voltage for feeding active and reactive power to the grid 18. The switches of the grid side power converter 15 are provided with suitable control voltages in order to provide the desired voltage and power to a grid 18.

The output from the grid side power converter 15 is filtered by means of inductors 16a, 16b, 16c in order to e.g. remove higher order harmonics from the output power signal. The output power signal is then provided to the grid 18 via a transformer 19. The output power signal may, if needed, be filtered by a second filter 17 in order to keep the interference or harmonic distortion at a low value.

Figure 2:
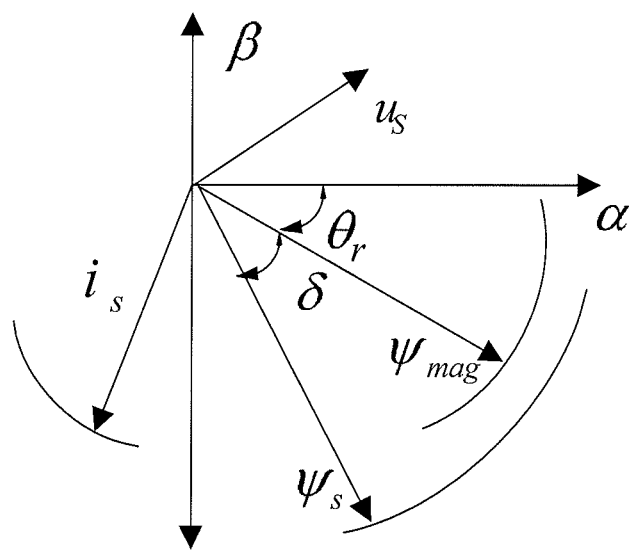
FIG. 2 illustrates a vector diagram for a synchronous generator represented in a stationary reference frame.

FIG. 2 illustrates a vector diagram for a synchronous generator represented in a stationary reference frame. The diagram comprises two stationary axes denoted α and β. The transformation from the stationary three phase abc reference frame to the αβ reference frame may be performed as disclosed above.

A first vector represents the magnetizing flux, denoted $\Psi_{mag}$ in the figure. In the example shown in FIG. 2, which refers to a synchronous generator, the magnetizing flux corresponds to the rotor flux. The rotor flux may be generated by means of a permanent magnet, as in a PM generator, by excitation of a field coil in the rotor (i.e. a wound generator)

or, if the invention is used together with an induction generator, by excitation from the rotating magnetic flux from the stator which induces currents in the rotor and thereby also produces a magnetic field. The arc at the tip of the rotor flux vector illustrates that the vector rotates about the origin of coordinates in the figure. The angular displacement of the rotor flux vector from the α axis is denoted $\theta_r$ in the figure.

In a corresponding manner is the stator flux vector, denoted $\Psi_s$ in the figure, represented by a vector which rotates about the origin of coordinates. In steady state operation the stator flux vector rotates in the stationary reference frame with an angular speed equal to the rotor flux vector. The angular displacement of the stator flux vector from the rotor flux vector is denoted by δ in the figure.

The electromagnetic power of a synchronous generator can be expressed as:

$$P_{EM} = v_a i_a + v_b i_b + v_c i_c \propto \omega \psi_s \times \psi_r$$

which gives $$P_{EM} = f(|\psi_s|, |\psi_r|, \delta)$$

It is seen from the power equation above that for a given speed of operation, the electromagnetic power depends on the magnitude of the stator flux vector and it's location with respect to the rotor flux vector. If the position of the rotor flux vector is known, it is possible to apply a voltage that will position the stator flux vector to give the desired magnitude of the power at a given speed. Hence, by controlling the stator flux vector, the electromagnetic (EM) power, which corresponds to the load power, can be obtained as commanded.

Since the control is carried out in the stationary reference frame, it may be necessary to compensate for the phase delay created. This is achieved by a linear prediction carried out in polar co-ordinates.

Figure 3:
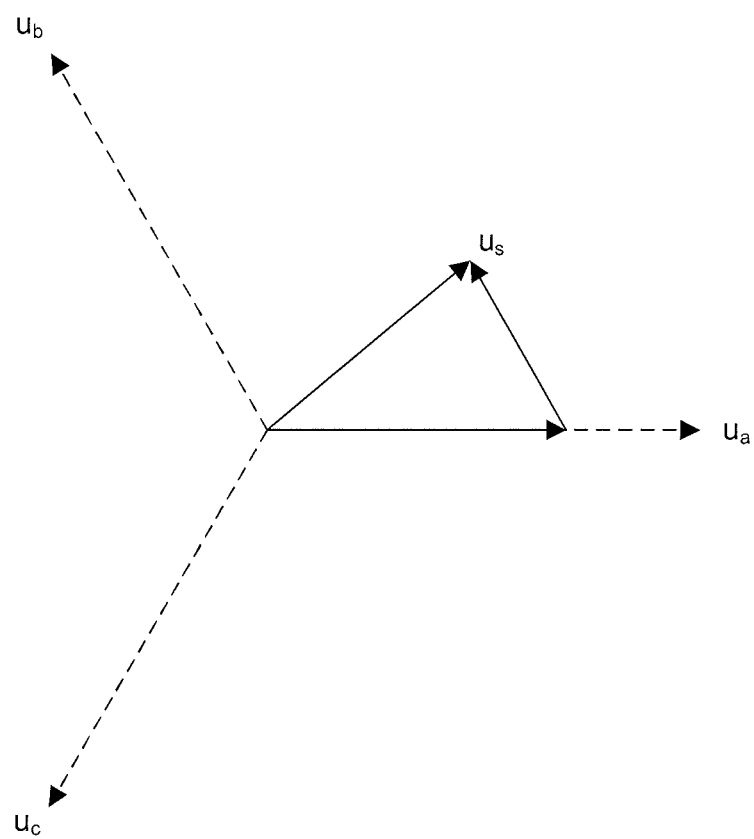
FIG. 3 illustrates a vector representation of the voltages present at the stator terminals of a generator.

FIG. 3 illustrates a vector representation of the voltages present at the stator terminals of a generator. In order to control the power created by the generator it is necessary to control the signals that are applied to the stator terminals. In this respect is space vector modulation (SVM) is an effective averaging algorithm for providing an AC output signal from a DC voltage. SVM also minimizes the harmonic contents which determines the copper losses in the generator. SVM is also effective in that it minimizes switching losses in the switches of the generator side power converter 13.

For a three phase generator, the voltages in the stationary abc reference frame may be represented as three 120° phase-shifted vectors (directions $u_a$, $u_b$ and $u_c$) in space, as shown in FIG. 3. For a balanced three phase system, these vectors sum to zero. This implies that the three vectors may be represented by a single space reference vector ($u_s$). The idea behind SVM is to control the amplitude and the frequency of Vs, which implies that voltage amplitude, phase and frequency at the stator terminals 12a, b, c and hence the flux in the stator can be controlled.

Figure 4A:
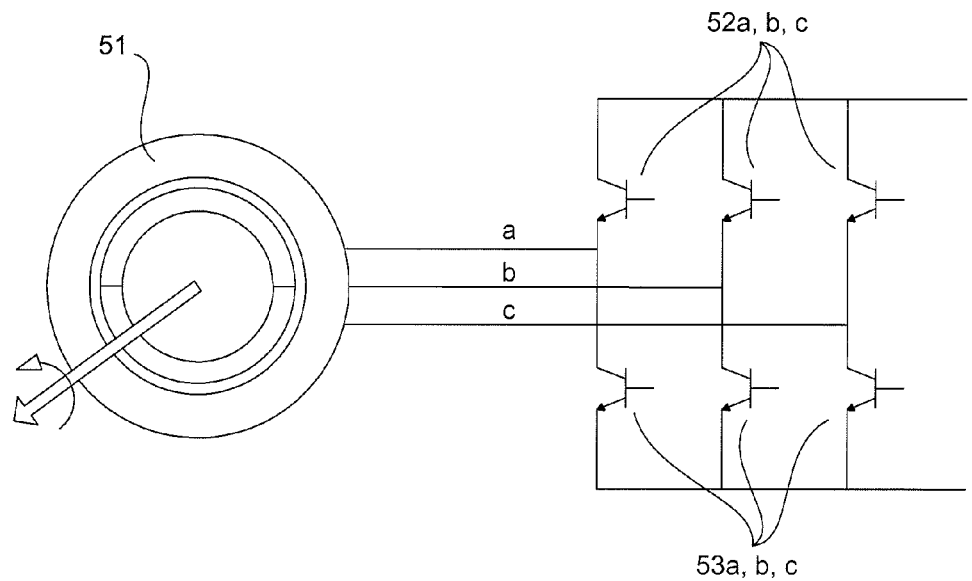
FIG. 4a is a more detailed illustration of the generator side converter illustrated in FIG. 1.

Referring to FIG. 4a, which is a more detailed illustration of the generator side converter 13 shown in FIG. 1. The switches 52ab b, c and 53a, b, c in the figure are illustrated as BJTs. It is, however, equally possible to use MOSFETs, GTOs, IGBTs etc as switching devices. Irrespective of the technology used for manufacturing the switches 52a, b, c, and 53a, b, c, the switching sequence, or switching pattern, of the devices must follow certain rules. More specifically, whenever one of the upper switches 52a, b, c is conducting (i.e. in an on-state) the corresponding lower switch 53a, b, c should be off and vice versa. Moreover must three of the switches always be on and three switches always be off. These rules gives rise to eight distinct combinations for the switching states of the devices 52a, b, c and 53a, b, c. These combinations are denoted (abc) where e.g. a=1, b=0 and c=0 indicates that the upper switch 52a is on (thereby turning switch 53a off) while switches 52b and c are off. Six of the states are active states producing a voltage vector in a predefined direction while two of the states are inactive states, i.e. all upper switches 52a, b, c are off and all lower switches 53a, b, c are on, or vice versa.

Figure 4B:
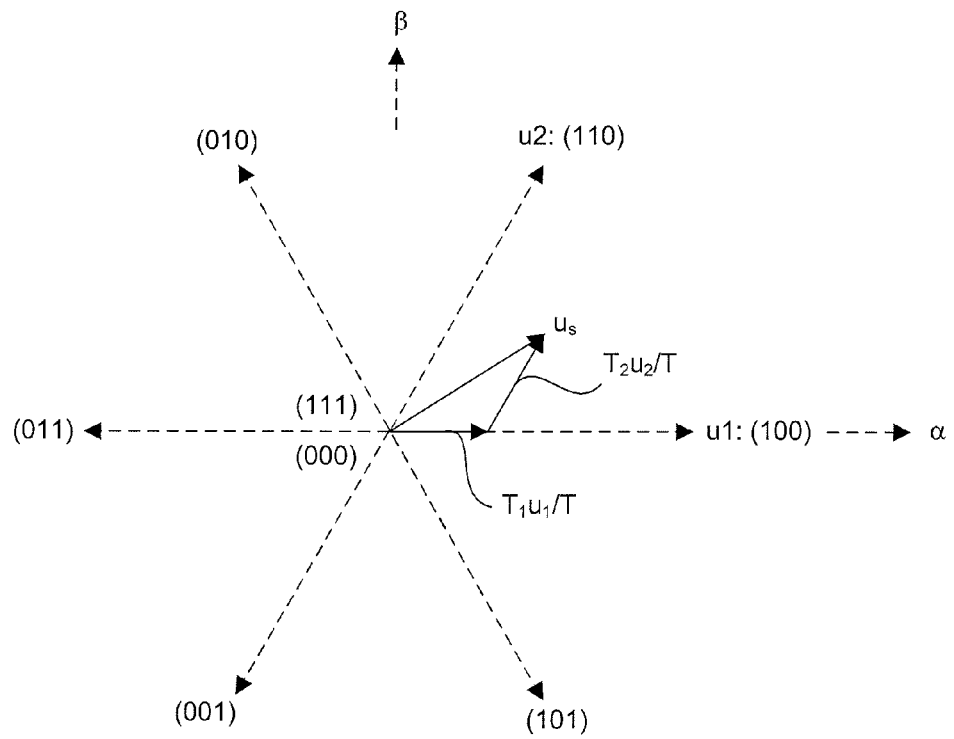
FIG. 4b illustrates eight switching states which determine a space vector hexagon.

The eight switching states defined above determine eight phase voltage configurations as illustrated in FIG. 4b. As seen in the figure, the vectors define a hexagon with six equally sized sectors spaced by 60°. Each sector is bounded by two active vectors. The inactive states are represented by the vectors (000) and (111) which are zero and are located at the hexagon origin. Two adjacent voltage vectors are chosen depending on the sector in which the vector $u_s$ is located (100 and 110 in FIG. 4b). From FIG. 4b it is clear that only one of the upper and lower switches are changing state when switching pattern moves from one sector to the adjacent sector, wherein the switching losses are kept at a minimum.

Normally, the switches are operated at a frequency F which is substantially higher than the grid frequency. The switching frequency F defines the sample period $\tau_s$ via the relationship $\tau_s = 1/F$. The sample period $\tau_s$ is used when generating the vector $V_s$ from the various voltage vectors (100, 110, etc). More specifically is the vector $u_s$ formed by time weighting the vectors during one sample period $\tau_s$. Mathematically may the vector $u_s$ be expressed as $$u_s = \frac{\tau_0}{\tau_s} u_0 + \frac{\tau_1}{\tau_s} u_1 + \ldots + \frac{\tau_7}{\tau_s} u_7$$

where $\tau_0, \tau_1 \ldots \tau_7$ is the time each vector $u_0, u_1 \ldots u_7$ is applied, respectively. The vectors $u_0$ and $u_7$ are the zero vectors (000, 111) which are applied in order to output a zero voltage.

When $u_s$ and $\tau_s$ are known it is possible to determine the on time for each vector, respectively, from the equations $$u_s = \frac{\tau_1}{\tau_s} u_1 + \frac{\tau_2}{\tau_s} u_2 + \frac{\tau_{07}}{\tau_s} u_{07}$$

and $$\tau_s = \tau_1 + \tau_2 + \tau_{07}$$

A problem resides in how to determine the desired vector $u_s$ in order to provide efficient control of the electrical power provided by the generator.

Figure 5A:
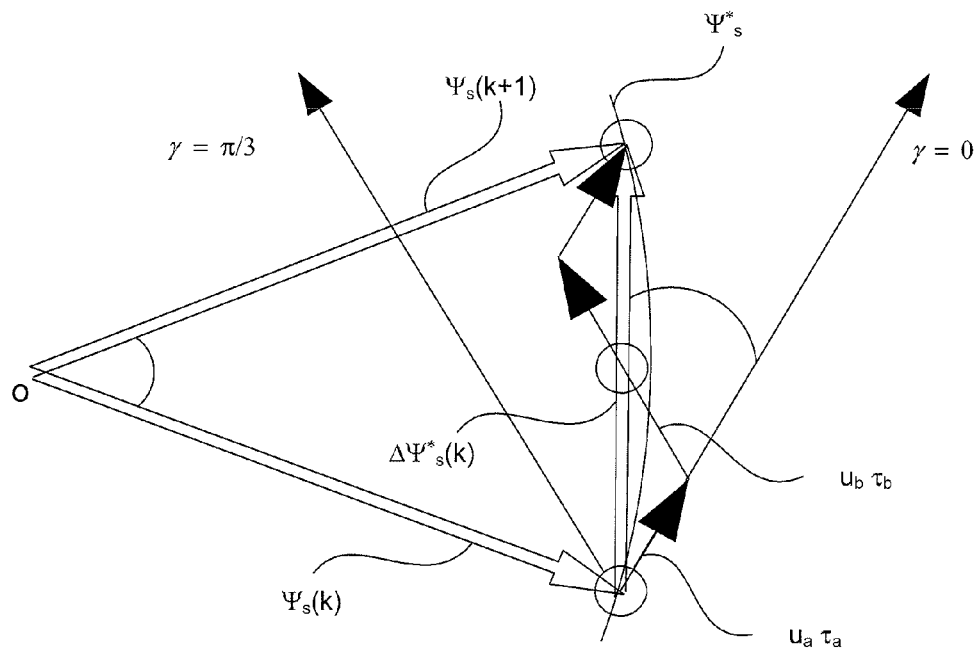
FIG. 5a illustrates one sector of the space vector hexagon illustrated in FIG. 4b.

FIG. 5a illustrates one sector of the space vector hexagon shown in FIG. 4b. The desired stator flux vector $\Psi_s$ at two subsequent time instances is illustrated as the vectors $\Psi_s(k)$ and $\Psi_s(k+1)$. The reference flux $\Psi_s^*$ is represented by a circular arc in the figure. The difference between the desired stator flux vector and the reference flux creates a flux error vector $\Delta\Psi_s^*(k)$ with a direction that is perpendicular to the direction of the desired flux. The flux in the stator relates to the generator EMF by the equation (Faraday's law)

$$e = \frac{d\Psi_s}{dt}$$

Figure 5B:
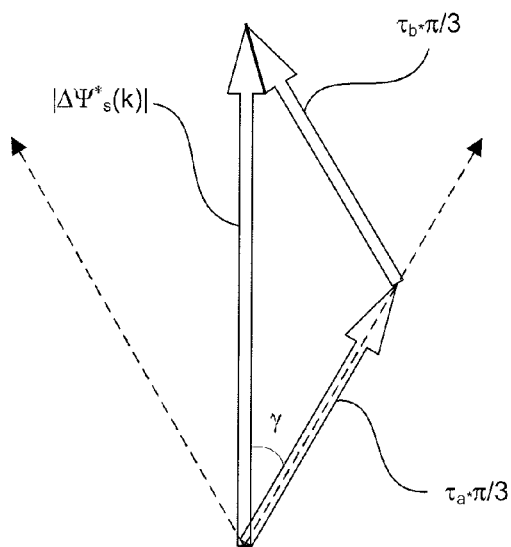
FIG. 5b illustrates a normalized voltage vector.

This implies that the flux error vector $\Delta\Psi_s^*(k)$ is proportional to a voltage vector that can be obtained as average in a sample using adjacent vectors and is displaced by an angle $\gamma$ with respect to the voltage vector $u_a$ (i.e. the active vectors $u_0$, $u_1$ etc) in any sector of operation. Hence $\gamma$ varies from 0 to 60 degrees in a sector. The time each active vector, e.g. $u_1$ and $u_2$ in FIG. 5 is applied is denoted by $\tau_a$ and $\tau_b$ in the figure FIG. 5b illustrates an example where a normalized voltage vector is used to generate the switching times. The base for normalization is taken to be the peak value of the fundamental component of the phase voltage during six-step operation $$u_{peak} = \frac{2}{\pi} U_{DC}$$

where $U_{DC}$ is the DC-link voltage of a two level inverter disclosed above. In the space vector modulation scheme it can be shown that the length of each of the six vectors ($u_1$-$u_6$) is $$u_u = \frac{2}{3} U_{DC}$$

wherein the normalization of the voltage becomes $$\text{Normalization} = \frac{\pi}{3}$$

From the figure it can be seen that $$\frac{\frac{\pi}{3}\tau_a}{\sin\left(\frac{\pi}{3} - \gamma\right)} = \frac{\frac{\pi}{3}\tau_b}{\sin(\gamma)} = \frac{|\Delta\Psi_s^*(k)|}{\sin\left(\frac{\pi}{3}\right)}$$

from which the switching times for each of the active vectors may be derived, such that they define the control signals that are applied to the switches in the generator side power converter 13, according to $$\tau_a = \frac{|\Delta\Psi_s^*(k)|\sin\left(\frac{\pi}{3} - \gamma\right)}{\frac{\pi}{3}\sin\left(\frac{\pi}{3}\right)}$$

$$\tau_b = \frac{|\Delta\Psi_s^*(k)|\sin(\gamma)}{\frac{\pi}{3}\sin\left(\frac{\pi}{3}\right)}$$

$$\tau_0 = \tau_s - (\tau_a + \tau_b)$$

where $\tau_a$ is the time the first vector is applied (e.g. vector u1 in FIG. 4b) and $\tau_b$ is the time the second vector is applied (e.g. vector u2 in FIG. 4b).

Figure 7:
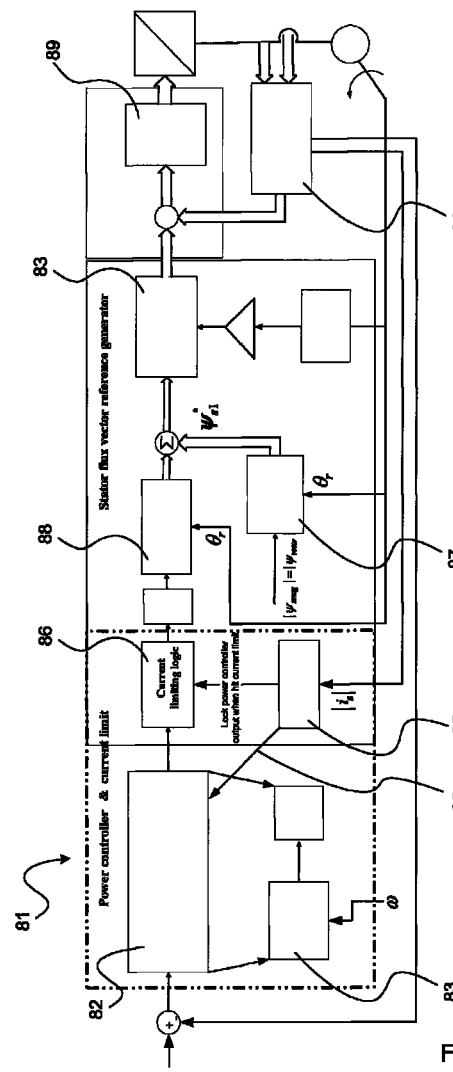
FIG. 7 illustrates a signal flow graph of a generator power and stator flux vector controller according to an embodiment of the invention.

Referring briefly to FIGS. 1, 4a and 7, the determined switching times are used as control signals by a switch control unit indicated by the PWM block 82. The PWM block 82 use the control signal for controlling the switches 52, 53 in the generator side power converter 13. By switching the states of the switches in the generator side power converter 13 it is possible to established stator electrical quantities such that a desired generator power level is achieved. More specifically, the control signals causes switches 52, 53 of the generator side power converter 13 to adjust the phase and voltage magnitude of its AC terminal voltage with respect to the EMF of the generator 11 in order to provide the desired electrical power.

Voltage generated by the generator side power converter 13 is defined by the requirement of the flux controller. So switching has to be carried out to mitigate the error in the stator flux vector $\Delta\Psi_s^*(k)$. This approach of flux vector control can be extended to any modulation index. During the normal space vector modulation range, the error can be compensated through switching in one sample.

Figure 6:
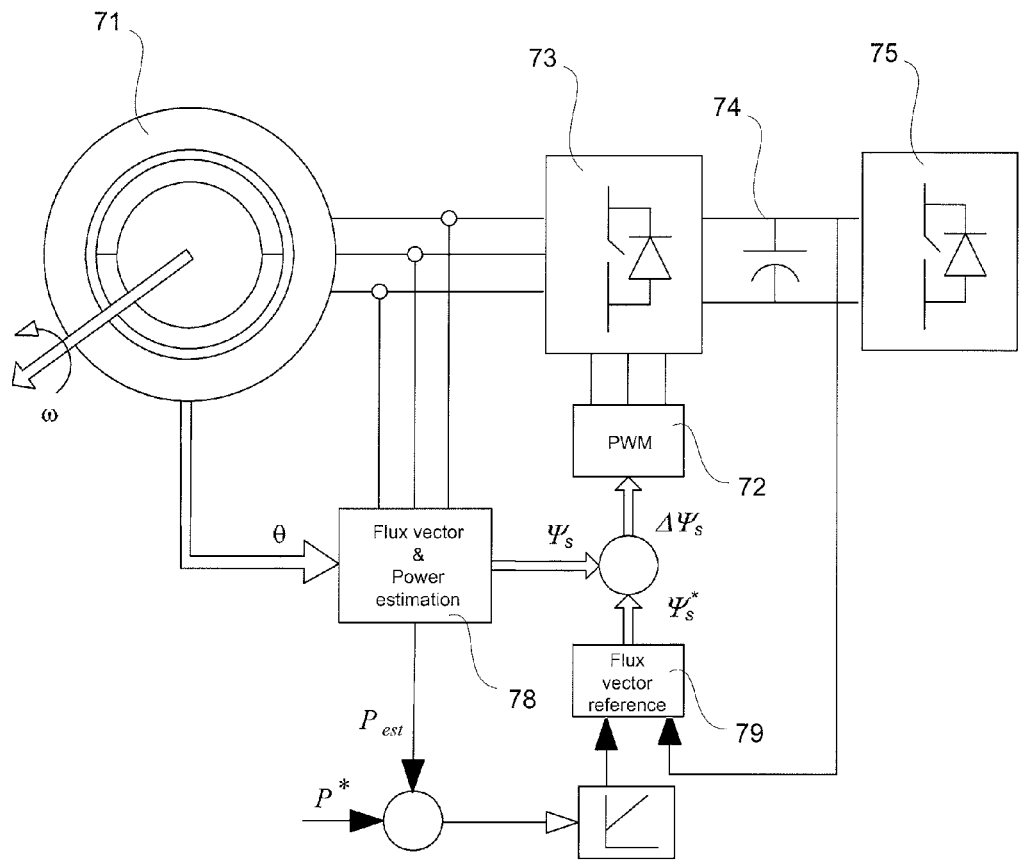
FIG. 6 illustrates a control system for controlling the power of a wind turbine generator according to an embodiment of the present invention.

FIG. 6 illustrates a control system for controlling the power of a wind turbine generator according to an embodiment of the present invention.

The power command to the converter control is compared with the estimated power provided by the generator 71. The mechanical dynamics of the system being slower allows the power controller 79 to be used directly to give the stator flux vector reference.

The generator 71 does not require reactive power unless at very high speeds when field weakening is needed. The EM design caters to this aspect of the generator. Hence it is the active power requirement that drives the power controller at slower generator dynamics. The stator flux vector is still controlled in a similar manner as explained above. The switching carried out using the stator flux vector error is same as has been described earlier.

FIG. 7 illustrates a signal flow graph of an embodiment of the generator power and stator flux vector controller.

The input to the signal flow graph is a power reference value ($P^*_e$) corresponding to an output power of a desired magnitude from the generator. The power reference value is compared with an actual power value ($P_e$) corresponding to the actual output power from the generator and the difference between these two values is provided to a power controller & current limiter (PCCL) block 81.

The PCCL block 81 is indicated with dashed lines in FIG. 7 and is designed to achieve same bandwidth at any operating frequency. The PCCL block 81 comprises a proportional and integral (PI) controller block 82. The PI gains are functions of speed due to the fact that the active power delivered by the generator is a function of both torque and speed. The PI gains hence need to be compensated for the speed of operation of the generator. Even though the speed has a very slow dynamic, it adds to the non-linearity in the control loop. To reduce/eliminate this non-linearity, the gains of the PI controller are adjusted by the speed compensation block 83 depending on the speed of operation of the generator. The output from the PI block is a current equivalent corresponding to a power and/or torque-producing stator flux of a desired magnitude for the generator.

The actual generator stator current $|i_s|$ is determined in a current, flux and power calculator block 84 and is fed back to a current limit detection block 85. The current limit detection block 85 monitors the actual stator current in order to detect if the magnitude of the current gets too big. If the magnitude of the actual stator current rises above a predefined threshold a signal is sent to a current limiting logic block 86. The current limiting logic block 86 is connected to the output from the PI block 82 and limits the current equivalent such that the maximum operating current of the generator is clamped at the rated value. The current limit detection block 85 may alternatively, if the actual stator current raises above the predefined threshold, send a signal to the PCCL block 81, as indicated by arrow 85a, in order to replace the difference between the power reference value and the actual power value with a zero value so as to limit the current equivalent. As disclosed above, limiting the current equivalent will enable clamping of the maximum operating current of the generator at the rated value.

When the operating current of the generator is clamped, the PCCL block 81 preferably monitors the sign of the difference between the power reference value and the actual power value for removing the zero value and restoring the difference value when the sign changes.

In order to obtain a minimum stator current for a given active power provided by the generator, a reference stator flux vector ($\Psi^*_s$) is defined to be a vector sum of a first stator flux vector component ($\Psi^*_{s1}$) and a second stator flux vector component ($\Psi^*_{s2}$) which is placed at an angle of 90 degrees with respect to the first stator flux vector component as indicated by the phase advancing block denoted "j" in the figure. The vector addition is accomplished in the stationary reference frame.

In a first vector generation block 87, the stator flux reference vector $\Psi^*_{s1}$ is computed from the magnetization flux component magnitude and the angle of rotor flux axis ($\theta_r$) relative to the $\alpha$-axis. More specifically, the stator flux reference vector $\Psi^*_{s1}$ may be computed as:

$$\psi_{\alpha\_s1}=\psi_{mag}*\cos(\theta_{rotor}) \text{ and } \psi_{\beta\_s1}=\psi_{mag}*\sin(\theta_{rotor})$$

Depending on the type of generator used the magnetization flux may be determined in many different ways. More specifically, in case the generator is a permanent magnet generator, the magnetization flux is fixed by the magnetic material in the rotor and the actual construction of the generator. If the generator is e.g. an induction generator the magnetization flux may be determined by measurements of the stator flux and the rotor position.

In a similar manner a second vector generation block 88 computes the stator flux reference vector $\Psi^*_{s2}$ from the power/torque-producing flux component magnitude (corresponding to the current equivalent output from the PCCL 81) as:

$$\psi_{\alpha\_s2}=\psi_{torque}*\cos(\theta_{rotor}+90°) \text{ and } \psi_{\beta\_s2}=\psi_{torque}*\sin(\theta_{rotor}+90°)$$

The total flux reference vector $\Psi^*_s$ is then computed according to:

$$\psi_\alpha^*=\psi_{\alpha\_s2} \text{ and } \psi_\beta^*=\psi_{\beta\_s1}+\psi_{\beta\_s2}$$

Since the stator current relates to the stator flux by $$\psi_{s2}^*=I_s*L_s$$

a limitation of the output from the PCCL 81 will hence limit the stator flux reference vector.

The phase error imposed in the discreet time implementation can be mitigated by using a linear extrapolation in the block "Flux vector phase prediction compensation" 83.

As disclosed above, the reference stator flux vector may then be used together with the actual stator flux vector in order to determine a stator flux difference vector which may be used by a PWM block 89 for controlling the switches of the generator side converter.

Figure 8:
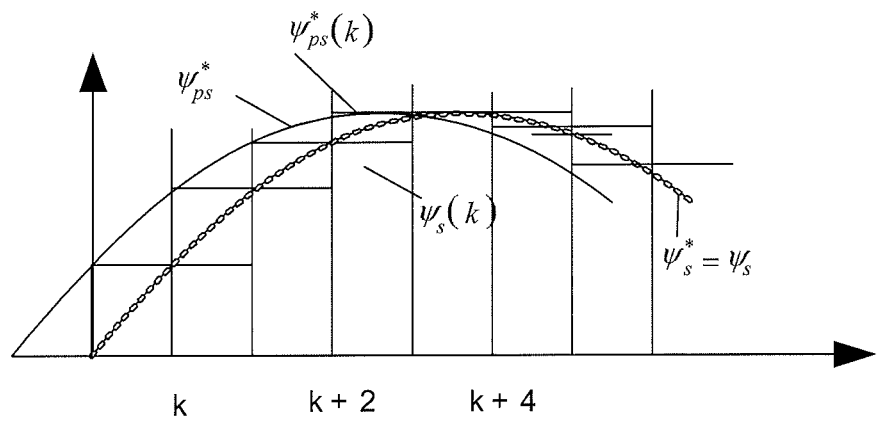
FIG. 8 illustrates a graph for achieving predictive control to mitigate a phase error in the stator flux vector.

Predictive control to mitigate the phase error of the stator flux vector is achieved as shown in FIG. 8. The prediction is carried out in polar co-ordinates and generates the stator flux vector $\psi_{ps}^*$. The estimated stator flux vector $\psi_s$ as shown is compared with the predicted reference stator flux vector and the error vector $\Delta\psi_s$ defines the switching states for control of active power and stator flux vector in the stationary frame of reference.

Figure 9:
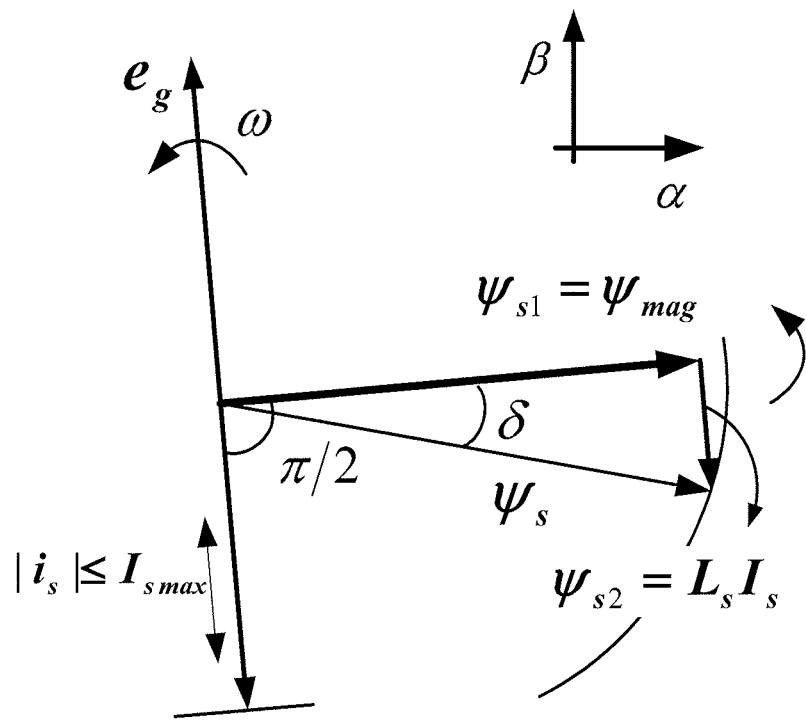
FIG. 9 illustrates a principle of current limiting in reference stator flux vector generation.

Principle of current limiting reference stator flux vector generation is shown in FIG. 9 The fact that no magnetization is needed for a rotor magnetized machine like surface mounted PM machine or a rotor fed synchronous machine, can be exploited to define the desired reference flux vector magnitude. FIG. 9 illustrates this. The current vector needed in such control is just to cater to the active power demand and not to set up any flux in the machine. Hence, the minimum current vector magnitude that can achieve this requirement should lie along a direction perpendicular to the rotor flux vector.

If the machine has to be used as motor, the current vector should lead the rotor flux vector otherwise it should lag the rotor flux vector as shown in the figure. Hence, the component of the reference flux vector that contributes to the torque or active power can be derived directly with the information of this current vector location. This involves the input of the rotor flux vector location, which is available from the position and/or incremental encoder attached to the shaft of the machine. For generators with saliencies in the rotor structure, sensorless operation can be incorporated by measuring the voltage and currents thereby removing the need for a speed/position sensor. The advantage is the possibility for the controller to limit the current in the stationary reference frame. At very high operational speeds, it is possible to have a demagnetizing component of the stator flux vector. Such component may also be needed when an interior PM machine is employed for power generation.

Figure 10:
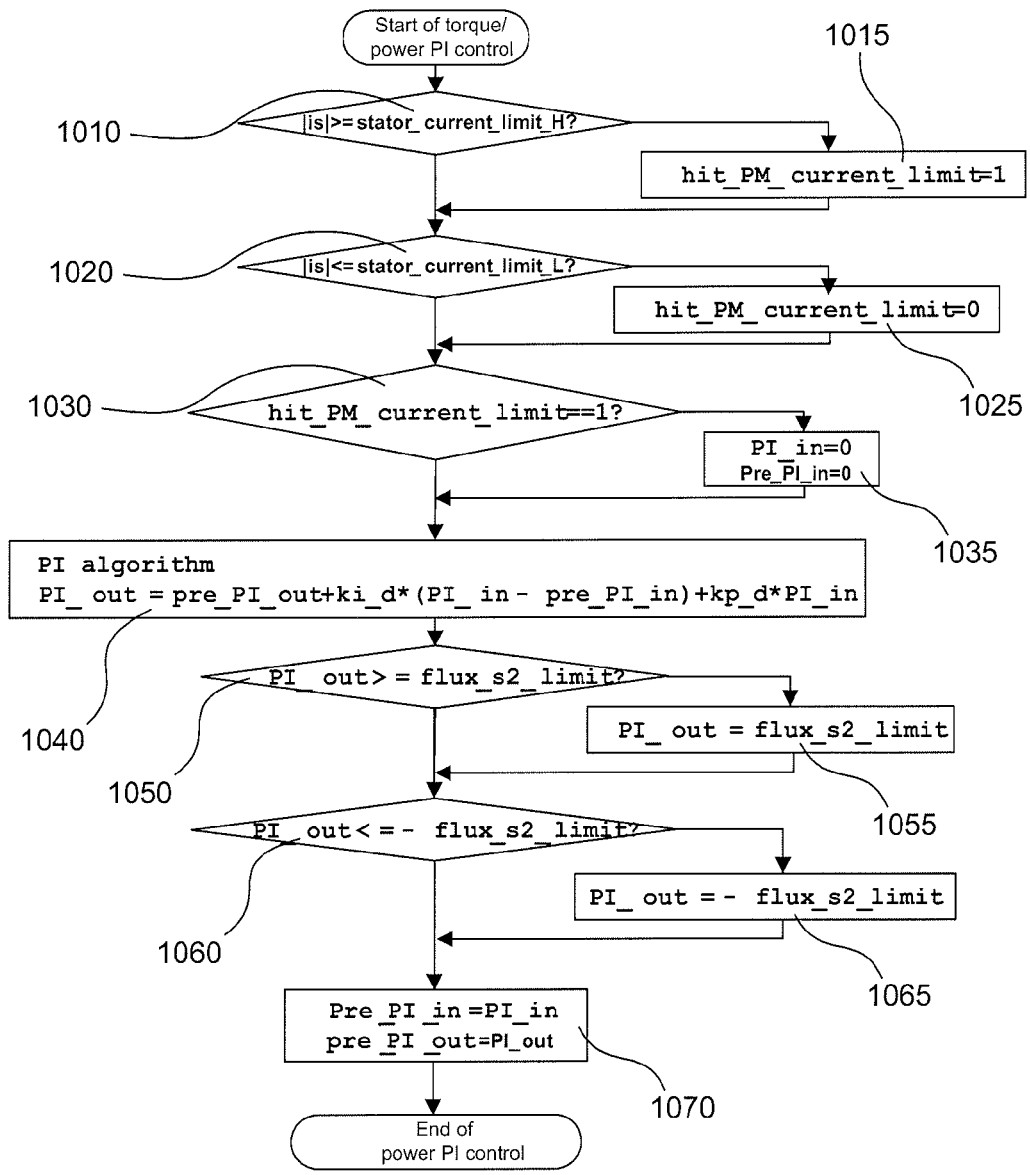
FIG. 10 illustrates the control algorithm for the power controller block shown in FIG. 7.

FIG. 10 shows the implementation algorithm of the power PI (Proportional and Integral) controller block 82 with the stator current limiting feature according to the present invention. Under normal operating conditions, the output of the power controller 81 defines the magnitude of the torque-producing stator flux reference. The magnetization stator flux reference is set to a constant nominal value. Since only the torque-producing stator flux reference is allowed to change, the stator current is effectively limited when the stator flux is frozen.

In FIG. 10 the algorithm begins in step 1010 where it is determined if the stator current is greater than a predetermined stator current high-limit.

If so the algorithm continues to step 1015 where a variable is set in order to indicate that the higher current limit is hit, whereupon the algorithm continues to step 1020. If not, the algorithm directly continues to step 1020 where it is determined if the stator current is less than a predetermined stator current low-limit.

If so the algorithm continues to step 1025 where a variable is set in order to indicate that the lower current limit is hit whereupon the algorithm continues to step 1030. If not, the algorithm directly continues to step 1030 where it is determined if the high current limit has been reached, and if so the regulator variables are reset in step 1035.

In step 1040 the output from the regulator is calculated using a PI (proportional and integral) algorithm. In the algorithm the proportional value determines the reaction to the signal error by multiplying the input with a discrete proportional gain (kp_d). The integral value determines the reaction based on the sum of recent errors by multiplying the difference between the current input and previous input with a discrete integral gain (ki_d).

In step 1050 the algorithm determines if the output from the controller has reached a value corresponding to a maximum power/torque-producing flux component magnitude.

If so the algorithm continues to step 1055 where the output is set to a predetermined positive limit value whereupon the algorithm continues to step 1060. If not, the algorithm continues directly to step 1060 where it is determined if the output from the controller has reached a value corresponding to a minimum power/torque-producing flux component magnitude.

If so the algorithm continues to step 1065 where the output is set to a predetermined negative limit value whereupon the algorithm continues to step 1070. If not, the algorithm continues directly to step 1070 where the regulator variables are updated.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for generating a stator flux reference vector for controlling a generator comprising a stator and a rotor, the method comprising:
   determining a first stator flux reference vector component corresponding to a magnetization flux of a desired magnitude for the generator;
   determining a magnitude of a current equivalent corresponding to a stator flux of a desired magnitude for the generator, wherein the stator flux is capable of producing at least one of power and torque;
   determining an actual stator current and adjusting the magnitude of the current equivalent when the actual stator current exceeds a predefined thresholds;
   determining a second stator flux reference vector component based on the adjusted current equivalent; and
   determining the stator flux reference vector based on the first and second stator flux reference vector components.

2. The method of claim 1, wherein the current equivalent is limited when the actual stator current exceeds the predefined threshold.

3. The method of claim 1, wherein the first stator flux reference vector component is based on the magnetization flux and an angular position of the rotor.

4. The method of claim 1, wherein the second stator flux reference vector component is based on the stator flux and an angular position of the rotor.

5. The method of claim 1, wherein the second stator flux vector reference component leads the first stator flux reference vector component by 90°.

6. The method of claim 1, further comprising:
   determining a power reference value corresponding to an output power of a desired magnitude from the generators;
   comparing the power reference value with an actual power value corresponding to actual output power from the generator; and
   determining the magnitude of the current equivalent based on the difference between the power reference value and the actual power value.

7. The method of claim 6, wherein the difference between the power reference value and the actual power value is replaced by a zero value for determining the magnitude of the current equivalent when the actual stator current exceeds the predefined threshold.

8. The method of claim 7, wherein the difference between the power reference value and the actual power value is restored for determining the magnitude of the current equivalent in response to a change of sign of the difference.

9. The method of claim 1, wherein the magnitude of the current equivalent is adjusted based on a rotating speed of the generator.

10. The method of claim 6, wherein the stator is connected to a plurality of switches in a power converter, and the plurality of switches are operated based on the stator flux reference vector to adapt at least one stator electrical quantity, thereby obtaining the output power of the desired magnitude from the generator.

11. The method of claim 10, further comprising:
    estimating an actual stator flux vector of the generator,
    determining a stator flux difference vector between the stator flux reference vector and the actual stator flux vector, and
    operating the plurality of switches based on the stator flux difference vector to adapt at least one stator electrical quantity, thereby obtaining the output power of the desired magnitude.

12. The method of claim 1, wherein the generator is one of a permanent magnet generator, a wound generator, and an induction generator.

13. An apparatus for generating a stator flux reference vector for controlling a generator comprising a stator and a rotor, the apparatus comprising:
    a first vector generator configured to determine a first stator flux reference vector component corresponding to a magnetization flux of a desired magnitude for the generator;
    a power controller configured to determine a magnitude of a current equivalent corresponding to a stator flux of a desired magnitude for the generator, wherein the stator flux is capable of producing at least one of power and torque;
    a current limiter configured to determine an actual stator current and adjust the magnitude of the current equivalent when the actual stator current exceeds a predefined threshold;
    a second vector generator configured to determine a second stator flux reference vector component based on the adjusted current equivalent; and
    a combiner configured to determine the stator flux reference vector based on the first and second stator flux reference vector components.

14. The apparatus of claim 13, wherein the current limiter is configured to limit the current equivalent when the actual stator current exceeds the predefined threshold.

15. The apparatus of claim 13, wherein the first vector generator is configured to determine the first stator flux reference vector component based on the magnetization flux and an angular position of the rotor.

16. The apparatus of claim 13, wherein the second vector generator is configured to determine the second stator flux reference vector component based on the stator flux and an angular position of the rotor.

17. The apparatus of claim 13, further comprising a phase advancer configured to shift the second stator flux vector reference component to lead the first stator flux reference vector component by 90°.

18. The apparatus of claim 13, further comprising:
    an input for receiving a power reference value corresponding to an output power of a desired magnitude from the generator; and
    a first comparator configured to compare the power reference value with an actual power value corresponding to actual output power from the generator,
    wherein the power controller is further configured to determine the magnitude of the current equivalent based on the difference between the power reference value and the actual power value.

19. The apparatus of claim 18, wherein the power controller is further configured to replace the difference between the power reference value and the actual power value with a zero value for determining the magnitude of the current equivalent when the actual stator current exceeds the predefined threshold.

20. The apparatus of claim 19, wherein the power controller is further configured to restore the difference between the power reference value and the actual power value for determining the magnitude of the current equivalent in response to a change of sign of the difference.

21. The apparatus of claim 13, wherein the power controller is further configured to adjust the magnitude of the current equivalent based on a rotating speed of the generator.

22. The apparatus of claim 18, wherein the stator is connected to a plurality of switches in a power converter, and the power converter is configured to operate the plurality of switches based on the stator flux reference vector to adapt at least one stator electrical quantity, thereby obtaining the output power of the desired magnitude from the generator.

23. The apparatus of claim 22, comprising:
a flux calculator configured to estimate an actual stator flux vector of the generator; and
a second comparator configured to determine a stator flux difference vector between the stator flux reference vector and the actual stator flux vector,
wherein the power converter is configured to operate the plurality of switches based on the stator flux difference vector to adapt at least one stator electrical quantity, thereby obtaining the output power of the desired magnitude.

24. The apparatus of claim 13, wherein the generator is one of a permanent magnet generator, a wound generator, and an induction generator.

25. A method for generating a stator flux reference vector for controlling a generator comprising a stator and a rotor, said method comprising:
determining a first stator flux reference vector component corresponding to a magnetization flux of a desired magnitude for the generator;
determining a power reference value corresponding to an output power of a desired magnitude from the generator;
comparing the power reference value with an actual power value corresponding to the actual output power from the generator;
determining a magnitude of a current equivalent corresponding to a power and/or torque-producing stator flux of a desired magnitude for the generator, wherein determining the magnitude of the current equivalent is based on the difference between the power reference value and the actual power value;
determining an actual stator current and adjusting the magnitude of the current equivalent if the actual stator current is above a predefined threshold;
determining a second stator flux reference vector component based on the adjusted current equivalent; and
determining a stator flux reference vector based on the first and second stator flux reference vector components,
wherein the difference between the power reference value and the actual power value is replaced by a zero value for determining the magnitude of the current equivalent if the actual stator current is above the predefined threshold.

26. An apparatus for generating a stator flux reference vector for controlling a generator comprising a stator and a rotor, said apparatus comprising:
a first vector generator for determining a first stator flux reference vector component corresponding to a magnetization flux of a desired magnitude for the generator;
an input for receiving a power reference value corresponding to an output power of a desired magnitude from the generator; and
a comparator for comparing the power reference value with an actual power value corresponding to the actual output power from the generator;
a power controller for determining a magnitude of current equivalent corresponding to a power and/or torque-producing stator flux of a desired magnitude for the generator, wherein the power controller is adapted to determine the magnitude of current equivalent based on the difference between the power reference value and the actual power value;
a current limiter for determining an actual stator current and adjusting the magnitude of the current equivalent if the actual stator current is above a redefined threshold;
a second vector generator for determining a second stator flux reference vector component based on the adjusted current equivalent; and
a combiner for determining a stator flux reference vector based on the first and second stator flux reference vector components,
wherein the power controller is adapted to replace the difference between the power reference value and the actual power value with a zero value for determining the magnitude of the current equivalent if the actual stator current is above the predefined threshold.

* * * * *